Dec. 25, 1951     H. F. HERBIG ET AL     2,579,493
METHOD FOR TESTING WOUND CORES
Filed Feb. 28, 1948
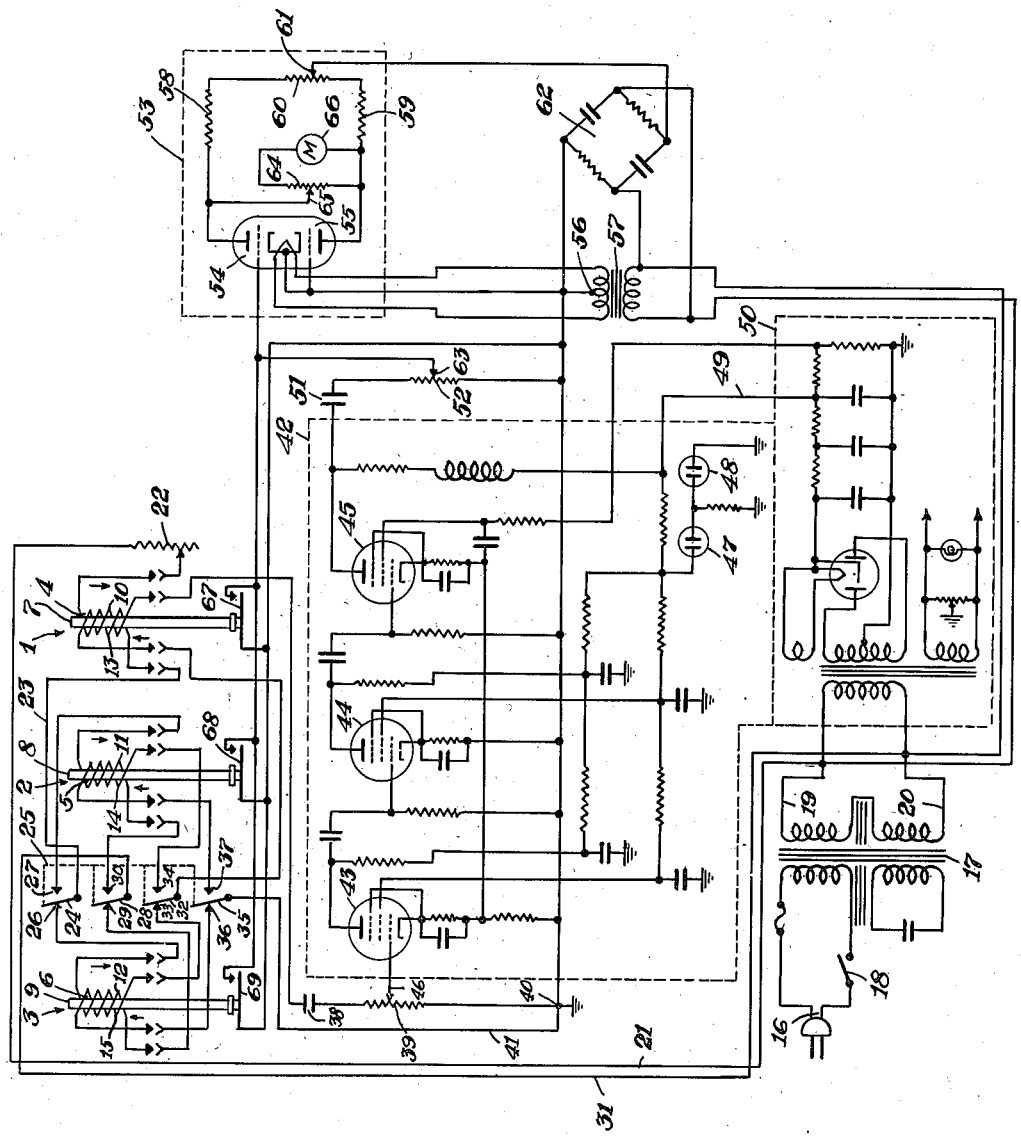
INVENTORS
HENRY F. HERBIG
JOHN J. McMANUS
BY
ATTORNEY Patented Dec. 25, 1951

2,579,493

UNITED STATES PATENT OFFICE 2,579,493

METHOD FOR TESTING WOUND CORES

Henry Frank Herbig, Mountain Lakes, N. J., and John Joseph McManus, Valley Stream, N. Y., assignors to International Standard Electric Corporation, New York, N. Y., a corporation of Delaware Application February 28, 1948, Serial No. 11,886

1 Claim. (Cl. 175—183)

This invention relates to a method of manufacturing wire-wound cores and also to a method of testing such cores both before and after the wire is wound thereon.

In the manufacture of wire-wound cores, for instance relay electromagnets, it may be important to eliminate or reduce to a minimum the number of short-circuited turns in the winding. This is especially true where the wound core is to be used in a high speed device, such as an electromagnet. After a core has been wound it is extremely difficult to tell whether or not any of the turns are short-circuited until the device fails in actual use. Apparatus has been produced which will indicate a relatively large number of shorted turns in the winding of an electromagnet, but no satisfactory apparatus has been produced for determining the existence of a small number of short-circuited turns, for instance, two or three.

It is therefore one of the objects of the invention to provide a method of manufacturing wirewound cores so that the short-circuited turns may be entirely eliminated or reduced to a minimum.

Another object of the invention is to provide an extremely sensitive method in which wirewound cores may be checked easily and very rapidly for short-circuited turns in the windings, the method detecting the presence of even one or two short-circuited turns in a coil having a large number of turns.

The apparatus of the invention comprises a pair of solenoid coils, one being a standard coil and the other a test coil, with openings provided in the centers to receive respectively a standard core and a test core, the latter either with or without a coil wound thereon. Each solenoid coil has primary and secondary windings, and circuit means is provided for connecting the primary windings to a source of undulating current, and second circuit means is provided for connecting the secondary windings in series and with such polarity that the voltages induced therein are in opposition to each other. Means is also provided for measuring this resultant voltage, this means being preferably a vacuum tube voltmeter.

In order to make the apparatus easier to operate we prefer to provide a third coil, preferred to as a "calibration coil," which may be alternatively connected in the circuit in place of the test coil for checking the calibration of the measuring means from time to time.

In manufacturing wound cores in accordance with the invention, the permeability of an unwound core is first determined with the apparatus and thereafter the core is wound with the desired number of turns of wire and the permeability again measured with the ends of the coil free. Any difference in these two measurements will be a measure of the number of short-circuited turns.

The above mentioned and other features and objects of this invention and the manner of obtaining them will become more apparent and the invention itself will be best understood by reference to the following description of an embodiment of the invention taken in conjunction with the accompanying drawing, wherein the single figure is a circuit diagram of an apparatus forming one embodiment of the invention.

Referring now more specifically to the drawing, the invention comprises three solenoids, 1, 2, and 3, arranged respectively with central openings 4, 5, and 6, which are large enough and properly shaped to permit the insertion of cores 7, 8, and 9. The coils 1, 2, and 3 have primary windings 10, 11, and 12, respectively, and secondary windings 13, 14, and 15, respectively, all of the coils being wound with the same size wire and the same number of turns and the ratio of primary turns to secondary turns being the same. For testing a certain type of electromagnet we have found it desirable to have 6500 turns of number 29 enamel copper wire in the primary windings and the same number of turns in the secondary windings, although the actual number of turns is unimportant. It is important, however, that the coils have as nearly as possible the same characteristics. The primary windings are on the inside of the solenoids.

The primary windings 11 and 12 are arranged to be alternatively connected in series with the primary winding 10 of the solenoid 1 across a source of alternating current 16. It is necessary for the successful operation of the apparatus to have a steady source of alternating current, and hence we provide a constant voltage input transformer 17, the input circuit of which is connected to the source of supply 16, through a switch 18. Such a transformer is well known in the art and may be provided to give an output voltage, for instance, of 115 volts plus or minus 1% with an input supply which varies from 95 volts to 125 volts.

The output leads 19 and 20 from this transformer are connected to the primary windings of the solenoids, the lead 19 being connected by means of a wire 21 to one end of the primary 10 of the solenoid 1 through a variable resistance 22. The other end of the primary 10 is connected by means of a wire 23 to one blade 24 of a multiple blade double-throw switch 25. The blade 24 of this switch cooperates with two contacts 26 and 27, the former contact being connected to one end of the primary 12 of the solenoid 3 and the latter contact being connected to one end of the primary 11 of the solenoid 2. The switch has another blade 28 which has two cooperating contacts 29 and 30, the former being connected to the other end of the primary 12 of the solenoid 3 and the latter being connected to the other end of the primary 11 of the solenoid 2. The blade 28 of the switch is connected by means of wire 31 to the lead 20 from the transformer 17.

It will be seen that, with the switch in the position shown in the drawing, the primary windings 10 and 12 of the solenoids 1 and 3 are connected in series with the power supply through the variable resistance 22, while when the switch is thrown into its other position, the primary windings 10 and 11 will be connected in series with the power supply, the primary winding 11 having been substituted for the primary winding 12 of the solenoid 3.

The secondary windings 13, 14, and 15 of the solenoids 1, 2, and 3 are similarly connected by means of the switch 25, except that the two secondary windings are always connected in series opposition. To this end the switch has a blade 32 which cooperates with two contacts 33 and 34 and a blade 35 which cooperates with two contacts 36 and 37. The contacts 34 and 37 are connected across the secondary winding 14 of the solenoid 2, while the contacts 33 and 36 are connected across the secondary winding 15 of the solenoid 3. The blade 32 is connected to one end of the secondary winding 13 of the solenoid 1, while the other end of this secondary is connected through the coupling condenser 38 to one end of a resistance 39, the other end of which is connected to ground at 40 and by means of a wire 41 to the blade 35 of the switch 25. The connection to the secondary winding 13, as has been indicated above, is such that this winding is in series opposition to either of the other windings, depending on the operation of the switch.

It will be seen that, with the switch 25 in the position shown, the secondary windings 13 and 15 of the solenoids 1 and 3 are connected in series opposition across the resistance 39, while if the switch 25 is thrown into the other position, the secondary windings 13 and 14 of the solenoids 1 and 2 are connected in series opposition across the resistance 39, the secondary winding 15 of the solenoid 3 being replaced by the secondary winding 14 of the solenoid 2.

The voltage appearing across the resistance 39 is amplified by a three-stage amplifier 42 having amplifier tubes 43, 44, and 45, the input of the amplifier being connected to a movable contact 46 on the resistance 39, so as to be able to utilize a portion of the voltage across the total resistance 39 for feeding into the amplifier.

The amplifier 42 may be any standard type of alternating voltage amplifier, although it is preferable to use one with some stabilizing arrangement, as, for instance, the network including the neon tubes 47 and 48 which is connected in the plate supply circuit. Suitable plate and screen voltages for the amplifier 42 may be provided by means of a power supply unit 50 which is energized by the constant voltage transformer 17.

The output of the amplifier 42 is applied through a coupling condenser 51 across a resistance 52 from which it is delivered to a suitable vacuum tube voltmeter 53. The vacuum tube voltmeter 53 comprises a pair of triodes 54 and 55, the cathodes of which are connected together and to the mid-point 56 of the secondary winding of a filament supply transformer 57, the primary winding of which is connected across the leads 19 and 20 of the constant voltage transformer 17. The plates of the triodes 54 and 55 are connected respectively to resistances 58 and 59, the other ends of which are connected to the opposite ends of a resistance 60 which is the winding of a potentiometer having a movable contact 61. The contact 61 is connected to one diagonal of a phase-shifting network 62, which is connected across the leads 19 and 20 of the transformer 17, so as to provide a 90° phase shift and thus compensate for the phase shift produced by the transformer action of the solenoids 1, 2, and 3. The other diagonal of the phase-shift network 62 is connected to the cathodes of the tubes 54 and 55.

The resistance 52 in the output of the amplifier has a movable contact 63 which is connected directly to the grid of the tube 54.

A resistance 64 is connected to the plate of the tube 55 while a movable contact 65 on that resistance is connected to the plate of the tube 54. Across the resistance 64 is connected the microammeter 66.

It will be seen that in effect the microammeter 66 is connected across one pair of diagonals of a bridge circuit, the alternating current supply being connected across the other pair of diagonals and the tubes being connected so that their plate-cathode circuits are in adjacent arms of the bridge. Voltage amplified by the amplifier 42 will affect the conductivity of the tube 54 which will unbalance the bridge so as to cause current to flow through the microammeter 66. Adjustment of the movable contact 65 will control the sensitivity of the microammeter, while the movable contact 61 may be adjusted to balance the bridge and therefore produce the zero reading on the microammeter.

Since the microammeter is required to be extremely sensitive to changes in the permeability of the cores in the solenoids 1, 2 and 3, it is desirable to provide some kind of protection for it to prevent damage if the circuit is energized without cores being present in the solenoids. We accomplish this by providing three micro switches 67, 68, and 69, located respectively at the bottoms of each of the solenoids 1, 2, and 3. These switches are connected in parallel between ground and the movable contact 63 which forms the input for the vacuum tube voltmeter and are normally closed, but arranged to be opened when the core is placed in the corresponding solenoid. With any one of the switches closed, the input of the vacuum tube voltmeter is short-circuited and hence there will be no effect on the microammeter. All three of the switches must, therefore, be opened by the presence of cores within the solenoids in order to operate the apparatus.

In using the apparatus in connection with the manufacture of wound cores the following procedure is recommended:

A core, as for instance, the core 7, which has been carefully determined by tests to be the standard core, is placed in the solenoid 1, thus opening the micro switch 67. A similar core 8, which from then on is to be used as a calibration core, is placed in the solenoid 2, thus opening the microswitch 68. A core, as for instance, the core 9, which is to be tested without any winding on it, is placed in the solenoid 3, thus opening the microswitch 69 and removing the short circuit of the input to the vacuum tube voltmeter and thus preparing the circuit for use.

With the switch in the right-hand position so that the contact blades 24, 28, 32, and 35 are respectively engaging the contacts 27, 30, 34, and 37, the secondary windings 13 and 14 of the standard and calibration solenoids respectively are connected in series opposition across resistance 39. When the power switch 18 is closed a voltage is induced in each of the secondary windings 13 and 14 and these voltages will oppose each other because of the connections of the secondary windings. A voltage, therefore, representing the difference of the two induced voltages will appear across resistance 39, and this voltage will be amplified by the amplifier 42 and the amplified voltage applied to the grid of the tube 54. This voltage will produce an unbalance in the bridge circuit, and the needle of the microammeter will be deflected depending on the condition of unbalance. The operator will then adjust the movable contact 61 until the bridge is balanced, which will be indicated by the needle being centered on its zero position.

The switch 25 is then thrown to the position shown in the figure, whereupon the primary and secondary windings 11 and 14 of the solenoid 2 will be replaced in the circuit by the primary and secondary windings 12 and 15 of the solenoid 3 and the voltage across the resistance 39 will be the difference between the voltages induced in the secondary windings 13 and 15. If the core 9 which has been inserted in the solenoid 3 has the same permeability as the standard core 7 there will be no deflection on the microammeter; if there is a deflection the core under test may be discarded.

With this apparatus a large number of cores may be tested in the solenoid 3 and separated into groups which cause no deflection of the microammeter needle, and therefore have the same permeability as the standard core, and those which produce the deflection indicating a different permeability.

The cores which are acceptable under this test are then wound with the desired number of turns of magnet wire for producing, for instance, electromagnets suitable for use in relays.

One of these wound cores with the ends of the coil, which is wound thereon left disconnected, is placed in the test cup. Insertion of the wound core into the test cup will open the microswitch 69 so that the voltage difference between the secondary windings 13 and 15 of the solenoids 1 and 3 will produce an effect in the vacuum tube voltmeter. If there are no short-circuited turns in the coils surrounding the core being tested there will be no deflection of the microammeter needle. If, however, there are one or more short-circuited turns in the coil of the test core, the effect will be the same as if the permeability of the core were changed, the vacuum tube voltmeter bridge will become unbalanced, and the needle of the microammeter will register a deflection.

The apparatus is so sensitive that it will indicate short-circuited turns in the order of 0.2 to 1% of the total number of turns on the winding.

The operator may test wound cores in rapid succession in the manner described above, inserting the cores into the test solenoid one after the other as fast as possible and noting the reading of the microammeter. From time-to-time the calibration of the meter should be tested by throwing the switch 25 and making the test with the calibration solenoid. This is desirable since changes in tube characteristics or other characteristics of the circuit may unbalance the bridge and cause a faulty reading.

In addition to the test for short-circuited turns in the winding on the core a test for an open coil may also be made. If the ends of the coil are connected together and a reading taken, it will be evident that the closed circuit of the coil around the core will have the same effect as a change in permeability of the core and will cause the needle of the microammeter to move off the scale. If the coil has a break in the windings somewhere the effect will be the same as if the ends of the coil were not connected and the reading of the microammeter may then be the same as it was with no winding on the core. This will indicate that the coil is open.

Although we have found it desirable to provide the calibration solenoid with the associated calibration core, it is possible to operate the apparatus with only the test solenoid, thus eliminating entirely the calibration solenoid on the switch 25. In such a case, calibration must be accomplished by inserting a calibration core which is the same as the standard core into the test solenoid and adjusting the microammeter needle to zero and then removing the calibration core and inserting the test cores as before. By having the calibration solenoid provided with its calibration core as a part of the apparatus the calibration becomes much easier and the operator is less likely to make an error in adjusting the apparatus.

In order to make the apparatus more flexible the solenoids are arranged with plug-in terminals so that they may be removed and replaced by other solenoids arranged for testing particular cores. The solenoids may be wound so that the center hole may have any configuration to fit a core of the same configuration and the sensitivity of the apparatus is improved when the shape of the solenoid opening corresponds to the configuration of the core and the spacing between the core and the windings of the solenoid is a minimum.

It will be seen from the above description that we have provided a method of manufacturing wound cores by means of which the number of cores in a completed run having short-circuited turns may be reduced to a minimum. We have also provided an apparatus by means of which cores may be tested for their permeability against a standard core and wound cores may be tested not only for short-circuited turns, but for open circuits in the winding.

While we have described above the principles of our invention in connection with specific apparatus, it is to be clearly understood that this description is made only by way of example and not as a limitation to the scope of our invention.

What is claimed is:

Method of testing windings on a core that comprises creating a first voltage related in magnitude to the permeability of the unwound core and measuring this reference voltage; producing a second voltage likewise related in magnitude to the permeability of the core with its open windings thereon and measuring this second voltage; electrically comparing the magnitude of said first and second voltage so that if there is a substantial difference between them, reflecting short circuited turns in the windings, the core and windings may be rejected; producing a third voltage likewise related in magnitude to the permeability of the core and windings after electrically connecting the winding ends and measuring said third voltage; and electrically comparing said third voltage with one of the previous voltages so that if there is not a substantial difference in magnitude between them the core and windings may be rejected for lack of continuity of the windings.

HENRY FRANK HERBIG.
JOHN JOSEPH McMANUS.

REFERENCES CITED

The following references are of record in the file of this patent:

UNITED STATES PATENTS

| Number | Name | Date |
|---|---|---|
| 1,551,383 | Gokhale | Aug. 25, 1925 |
| 1,588,539 | Fortescue | June 15, 1926 |
| 1,676,195 | MacWilliams | July 3, 1928 |
| 1,686,679 | Burrows | Oct. 9, 1928 |
| 2,034,502 | Zuschlag | Mar. 17, 1936 |
| 2,102,450 | Zuschlag | Dec. 14, 1937 |
| 2,432,948 | Thompson | Dec. 15, 1947 |